May 8, 1962  D. G. GUMPERTZ  3,033,367
METHOD AND APPARATUS FOR IDENTIFYING CONTAINERS
Original Filed Nov. 19, 1951  3 Sheets-Sheet 1

INVENTOR.
DONALD G. GUMPERTZ
BY
Christie, Parker & Hale
Attorneys

May 8, 1962 D. G. GUMPERTZ 3,033,367
METHOD AND APPARATUS FOR IDENTIFYING CONTAINERS
Original Filed Nov. 19, 1951 3 Sheets-Sheet 3

INVENTOR.
DONALD G. GUMPERTZ
BY Christie, Parker & Hale
Attorneys

United States Patent Office 3,033,367
Patented May 8, 1962

3,033,367
METHOD AND APPARATUS FOR IDENTIFYING CONTAINERS
Donald G. Gumpertz, 5528 Vineland Ave.,
North Hollywood, Calif.
Original application Nov. 19, 1951, Ser. No. 257,159, now Patent No. 2,989,735, dated June 20, 1961. Divided and this application May 9, 1960, Ser. No. 27,925
25 Claims. (Cl. 209—111.5)

My invention relates to container identifying systems, and has particular reference to a system for identifying the character and quality of the contents of containers prior to the labeling of the containers.

This application is a division of my copending application Serial No. 257,159 filed November 19, 1951, and entitled "Method and Apparatus for Identifying Containers," now Patent No. 2,989,735, granted June 20, 1961 which application was a continuation-in-part of my application Serial No. 28,919 filed May 24, 1948 and entitled "Container Identifying System," now abandoned.

In various industries employing containers, particularly containers of the metal can type, considerable difficulty is encountered during the canning process in segregating the cans in which different types, characters, or qualities of products have been placed, but on which the identifying labels have not as yet been attached. For example, in food canning it is the common practice for the cannery to prepare the material to be canned in several grades or qualities, and to place the various grades in metal cans which are capped and then passed to cooking, sterilizing, labeling, or other stations in the processing.

As it is impossible to know what grade or quality is in a particular unmarked can after it is capped, it has heretofore been a common practice to pack the various products or grades in "batches" so that only a single grade of a single product is involved. This, of course, requires the packing operation to be interrupted between batches in order to minimize confusion. Such a practice is uneconomical in that it prevents continuous use of the canning and processing machinery and requires careful segregation of the separate batches in order that there may be no confusion or mislabeling of the finished product.

It also occurs that in some canneries several different products may be canned in the same canning and processing machinery. In such case also it is necessary to interrupt all operations between the canning of one product and the canning and processing of another product in order to prevent confusion and mixing of the filled cans before the appropriate identifying labels are attached.

Because of the disadvantages of the batch method, many canners mark the cans with paint or ink as they are filled, such marks being used to permit manual sorting of cans before labeling. Because of the personal factor, such methods are unreliable and costly. More recently, photoelectric detectors have been substituted for the manual sorting, but results have been disappointing because of the difficulty of marking the cans rapidly (in some canneries the marking must be done in a fraction of a second) and because the markings were frequently mutilated or obliterated entirely by the processing and handling to which the cans were subjected between the marking and detecting stations.

According to the present invention, cans are magnetically marked around their periphery in accordance with a frequency code. The frequency is utilized to indicate the contents of the can. Cans are sorted and processed according to their frequency code. The frequency code consists of discrete magnetized portions, the number of which are proportional to the associated frequency. The sorting and processing operations are controlled by reading-out the number of discrete magnetized portions as an A.-C. frequency. This output frequency is then utilized to direct the canning operations.

Figure 1:
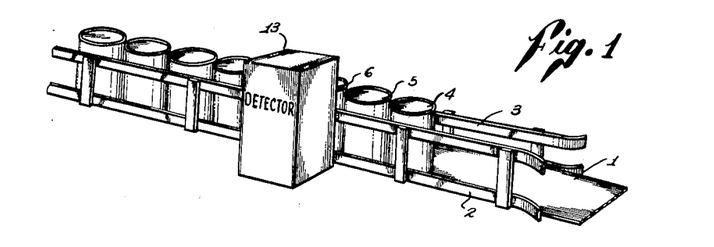
FIG. 1 is a diagrammatic perspective view of a portion of a container conveyor system such as is commonly employed in canneries to convey filled and capped cans to other processing machines in the cannery, and illustrating a detector by which the contents of the cans may be identified.

The invention may be more readily understood by referring to the accompanying drawings in which:

FIGURE 1 is a diagrammatic view of a portion of a can conveyor such as is commonly employed in canneries for the purpose of conveying cans from one processing station to another. The conveyor shown in FIG. 1 may be understood to deliver the cans to an ultimate stage at which the label identifying the product or its quality will be applied.

Such conveyors may comprise a conveyor belt 1 passing between guards rails 2 and 3 which serve to keep on the belt 1 a series of cans 4, 5, and 6 as such cans are carried along by the movement of the belt 1. A detector 13 is mounted at the side of the conveyor 1 for the purpose of identifying each of the cans as they move past the detector.

Figure 2:
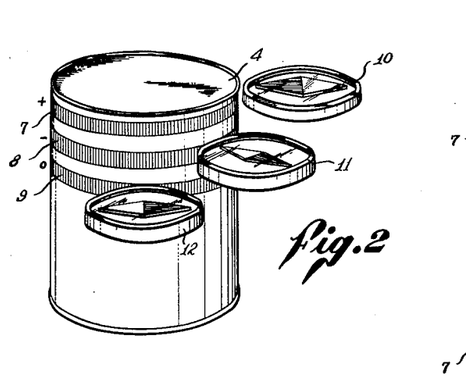
FIG. 2 is an enlarged perspective diagrammatic view illustrating a single can carrying identifying magnetic markings and illustrating the manner in which separate detecting devices may be employed for identifying the contents of the can by the magnetic markings carried thereby.

In FIG. 2 I have illustrated a typical magnetic identification which may be placed upon the cans, as consisting of one or more magnetized bands such as bands 7, 8, and 9 extending about the can. Each of the three bands 7, 8, and 9 may be magnetized according to any one of three modes which I have identified as plus, minus, and zero, such indications being marked on FIG. 2 as applicable to the bands 7, 8, and 9, respectively. The identification "plus" is used to indicate that the magnetic polarity of the band is such as to attract the north pole of a detecting magnet such as an ordinary magnetic compass needle. Similarly, the designation "minus" is used to indicate a magnetic polarity such as will attract the south pole of a magnetic compass needle. The designation "zero" is used to indicate the absence of magnetism of any single polarity, and to indicate therefore the inability of the band to affect a compass needle.

In FIG. 2 I have illustrated three compass needles 10, 11, and 12. These three compass needles comprise one form of detecting apparatus represented generally by the housing marked 13 in FIG. 1, it being understood that the compass needles 10, 11, and 12 are mounted in the housing 13 in such a way as to be capable of ready observation. The compass needles are mounted at respective elevations corresponding to the longitudinal location of the bands 7, 8, and 9 on the cans 4, 5, and 6. The indications "plus," "minus," and "zero," respectively, for the bands 7, 8, and 9 may be used, for example, to represent a product of grade A enclosed within the container 4. If it be assumed that containers 5 and 6 are filled with products of grade B and grade C, respectively, the arrangement of the various polarities as among the bands 7, 8, and 9 will be different for the two other containers 5 and 6.

Cans 5, containing, for example, product of the quality known as grade B, would have the polarity of the bands arranged differently so that as these cans pass the detector 13 the compass needles 10, 11, and 12 will readily read the magnetic recordings and identify to an operator the quality of the product in the can.

Figure 3:
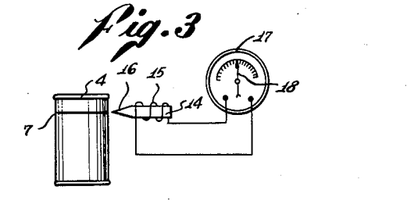
FIG. 3 is a diagrammatic view of a modified form of detector which may be employed with the cans shown in FIGS. 1 and 2.

While ordinary compass needles arranged at different levels in the detector 13 illustrated in FIG. 1 may be employed for the detecting and identifying of the contents of any given can, other types of detecting elements may be substituted for each such compass needle. For example, one may use an electromagnetic detector such as is illustrated in FIG. 3 as comprising a suitable core 14 of magnetizable material disposed within a coil 15 and having a pole 16 disposed at a level corresponding to the level of one of the magnetic bands such as the band 7 on the can 4. The passage of the magnetic band 7 past the pole 16 will cause the generation of an electric current of a given polarity in the coil 15, and by connecting the coil to a suitable galvanometer 17, preferably of the zero center type, the polarity of the band 7 may be readily detected and indicated by the directions of the fluctuations of the galvanometer needle 18, as the can approaches the detecting station and recedes therefrom. It will be understood that as the can approaches the detecting station, current generated in the coil 15 will flow in one direction, depending upon the polarity of the magnetic band 7, while as the can recedes from the detecting station, the current generated in the coil 15 will flow in the opposite direction. Hence, the galvanometer needle 18 will move first to the right and then to the left of its center position if the band 7 is of one polarity, whereas if the band 7 is of the opposite polarity, the approach of the can will cause the needle to move first to the left and will cause the needle to thereafter move to the right as the can leaves the detecting station. This produces a readily observable and translatable indication identifying the polarity of the band 7.

Figure 4:
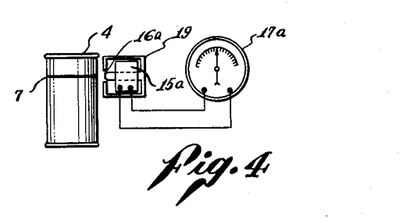
FIG. 4 is a diagrammatic view of a still further modified form of detector which may be employed with the cans shown in FIGS. 1 and 2.

In FIG. 4 I have illustrated a still further modified form of detecting element in which the detecting pole 16a is provided with a coil 15a, the pole 16a comprising a part of a pole piece structure 19 which extends about the coil 15a to provide a relatively narrow air gap between the opposite poles of the pole structure, such gap being aligned with the level of the band 7. The current generated in the coil 15a by the movement of the can past the pole 16a may be detected by a galvanometer 17a as explained in connection with FIG. 3.

Figure 5:
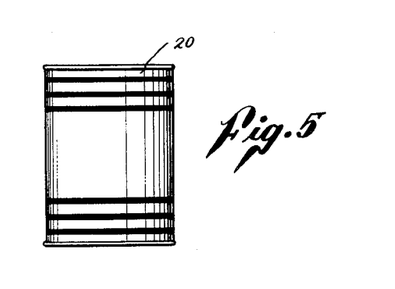
FIG. 5 is a diagrammatic view illustrating the manner in which a single can may be provided with a multiplicity of identifying magnetic markings by which the range of identification may be multiplied.

In view of the fact that the cans may be supplied to the conveyor with either of their ends up, the cans may be marked as shown in FIG. 5 wherein I have illustrated a can 20 which is provided with three magnetized bands adjacent the top of the can, and an additional three magnetized bands adjacent the bottom of the can, each of these bands being magnetized with one or the other of two polarities or an alternating polarity as previously described. Such an arrangement of the markings permits the detection of the contents of the cans regardless of which end of the can is up as it passes the detecting apparatus.

Figure 6:
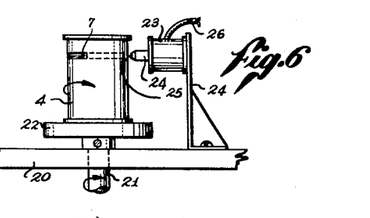
FIG. 6 is a fragmentary elevational view of a magnetic marking apparatus suitable for use in applying magnetic markings such as are represented in FIGS. 1 through 5.

I have illustrated in FIG. 6 a marking device which may be used for providing the magnetized bands such as the bands 7, 8, and 9. The marking device shown in FIG. 6 is intended for use at the capping station or similar stage in the processing sequence whereat the cans are rotated about their longitudinal axes. A typical capping station includes a main supporting framework, a portion of which is represented in FIG. 6 by the horizontally disposed structural member 20. The member 20 serves to journal for rotation a vertically disposed shaft 21 to the upper end of which is affixed a turntable 22. During the capping operation, an open can such as the can 4 is placed upon the turntable 22 and rotated about its longitudinal axis during the application of the cap to the can, such rotation being effected by appropriate rotation of the shaft 21 through a conventional driving mechanism, not shown.

While the can 4 is rotating, the band 7 may be magnetized by the energization of an electromagnet 23. The electromagnet 23 is suitably mounted upon a supporting bracket 24 secured to the base frame 20. The magnet 23 includes a magnetic core 24 which terminates in a pole face 25 of appropriate width disposed in close proximity to the outer surface of the can 4. Electric current for energizing the electromagnet 23 may be appropriately supplied through suitable electrical conductors 26.

It will be understood that if the band 7 is to be magnetized according to one polarity such as has hereinbefore been designated as plus, for example, a unidirectional current is caused to flow in the electromagnet 23 in a given direction, whereas the direction of current flow is reversed in the event a magnetized band of opposite polarity such as has been hereinbefore designated as minus, is desired to be produced. Also, for the type of magnetized band hereinbefore designated zero, a suitable alternating current would be supplied to the electromagnet 23. This would cause the band 7 to constitute an alternating series of oppositely polarized magnetized areas.

While but a single electromagnet 23 has been illustrated in FIG. 6, it will be understood that if a coding system utilizing two or more magnetized bands is employed, a corresponding number of electromagnets 23 would be mounted upon the bracket 24 at suitable elevations relative to the height of the can.

In some canning operations, there is no need for identifying the contents of the can for the reason that the processing apparatus is used to package only a single character and quality of product. However, in certain canning establishments of this type, it is desired to so place the label on the can as to position a given one of the can ends uppermost when the label is upright. For example, in the canning of tuna the canners prefer to so label the cans that the bottom of the can is uppermost when the label is in an upright position, for the reason that when a can of tuna is opened, the contents exposed by the removal of the bottom of the can present a much more pleasing and attractive appearance than do the contents exposed by the removal of the top of the can, such difference in appearance resulting from the manner in which the fish is placed in the can at the filling station. Since most users instinctively open cans with the label upright, such users can be caused to open the bottom of the can by placing the label on the can upside down.

Since the cans of tuna are not all maintained in the same attitude during various phases of the processing, the cans delivered to the labeling station by the conveyor are on the average half rightside up and half wrongside up. According to my invention, this fact and the attitude of each individual can may be detected and indicated by longitudinally magnetizing the entire can in an appropriate manner.

Figure 7:
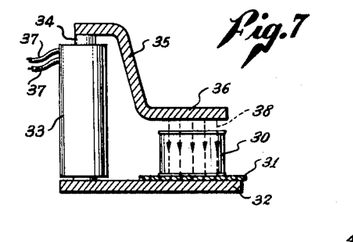
FIG. 7 is a sectional view of a magnetic marking apparatus which may be used alternatively as a marking device or a detecting device according to one embodiment of my invention.

I have illustrated in FIG. 7 an apparatus which may be used to longitudinally magnetize a can, and which likewise may be used to detect the attitude of a magnetized can. In FIG. 7 I have illustrated a can 30 as being carried by a conveyor belt 31 which rests upon a base plate 32 of magnetic material, it being understood that the base plate 32 is stationary, with the conveyor belt 31 moving relative thereto in a direction perpendicular to the plane of the drawing. At one side of the conveyor 31 there is secured to the base plate 32 an electromagnet 33 comprising a suitable coil wound about a magnetic core 34. One end of the core 34 is magnetically connected to the base plate 32, and the other end is connected to a pole shoe 35 which extends inwardly over the conveyor belt 31 and terminates in a pole face member 36 disposed parallel to the conveyor belt 31 and spaced thereabove a distance sufficient to allow the cans 30 to pass freely beneath the pole shoe 35. Application of a unidirectional current to the coil of the electromagnet 33 as by means of the electrical conductors 37 produces a unidirectional magnetic flux between the pole shoe 35 and the base plate 32, such magnetic flux being represented in FIG. 7 by the dotted lines 38.

It will be seen that as the can 30 is moved by the conveyor belt 31 through the space between the base plate 32 and the pole shoe 35, it will be subjected to the unidirectional magnetic flux 38 and so permanently magnetized as to cause one end of the can 30 to constitute a north pole of the magnet, and the other end to constitute a south pole thereof. In order that the polarity of the permanent magnet thus produced may correctly identify the attitude of the can 30, it is, of course, essential that all of the cans 30 passing the magnetizing apparatus be disposed in like relative attitudes. A convenient location for the magnetizing apparatus is on the conveyor leading from the capping station, at which location the cans 30 are all rightside up with the caps uppermost.

The apparatus shown in FIG. 7 may also be used as a detecting apparatus and installed on the conveyor leading to the labeling station. When used as a detecting apparatus, the conductors 37 are connected to a suitable indicating device such as a galvanometer of the character illustrated in FIGS. 3 and 4. It will be understood, of course, that as the conveyor 31 moves a magnetized can through the space between the pole face 36 and the base plate 32, an electrical potential will be generated in the coil 33 to cause the needle of the galvanometer to deflect in one direction as the can enters such space, and to deflect in the opposite direction as the can leaves such space. The direction of these galvanometer needle deflections is dependent upon the polarity of the uppermost and lowermost ends of the magnetized can and so serves to indicate whether the can is rightside up or wrongside up. Those cans which are found to be in the wrong attitude may be manually inverted, or turned over by the use of suitable mechanism.

Figure 8:
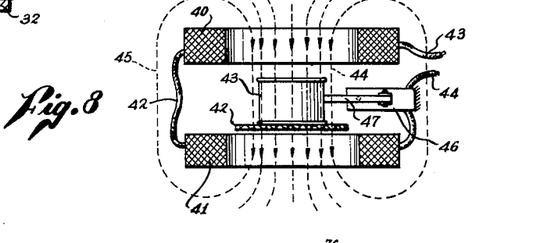
FIG. 8 is a fragmentary sectional view illustrating the construction and arrangement of a marking and detecting apparatus constituting a modification of the type shown in FIG. 7.

FIG. 8 illustrates a modified form of magnetizing apparatus for magnetizing a can longitudinally in the same manner as the can 30 is magnetized by the apparatus shown in FIG. 7. The apparatus shown in FIG. 8 comprises a pair of doughnut-like magnetic coils 40 and 41 positioned above and below a conveyor belt 42 and spaced apart a distance sufficient to allow a can 43 resting on the conveyor belt 42 to pass between the adjacent faces of the coils 40 and 41. The coils 40 and 41 are interconnected in series-aiding relationship as by a conductor 42 so that a unidirectional current supplied to the coils through conductors 43 and 44 will produce an axial unidirectional magnetic field extending parallel to the axis of the can 43 much in the manner represented by the dotted lines 44 in FIG. 8.

In will be appreciated that if the coils 40 and 41 are maintained continuously energized, the permanently magnetized can 43 would be largely demagnetized by the flux linking the coils around the outside thereof as is represented by the dotted line 45 in FIG. 8, as the can leaves the marking station. Accordingly, I interpose in the conductor 44 a momentary contact switch mechanism 46 having an actuating arm 47 so positioned as to be engaged by the can 43 and moved by the passage of the can through the space between the coils 40 and 41. The switch actuating mechanism is so adjusted as to complete the circuit for energizing the coils 40 and 41 after the can 43 has entered the space between the coils, to maintain the coils energized for a brief period of time, and to deenergize the coils before the can 43 passes into a region where its permanently magnetized condition will be influenced by the exterior flux linkages 45.

The apparatus illustrated in FIG. 8 may be used also to detect the attitude of a previously magnetized can in a manner identical to that described in connection with the magnetizing structure shown in FIG. 7. However, if the structure of FIG. 8 is used as a detecting device, the switch 46 is omitted.

Figures 9, 15:
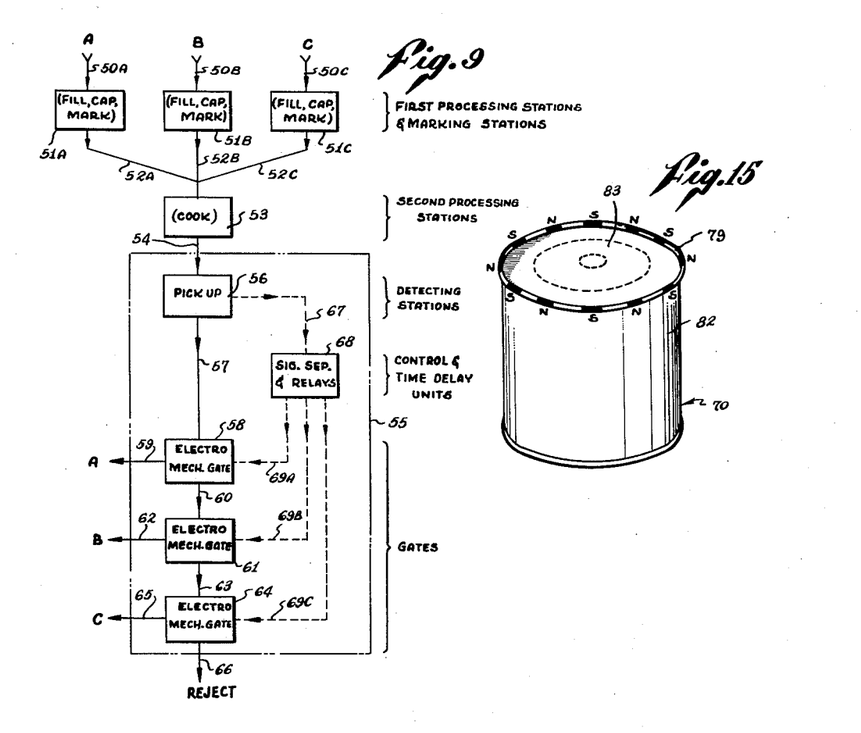
FIG. 9 is a block diagram illustrating a typical canning process and illustrating diagrammatically the mode of operation of an automatic segregating apparatus utilizing the principles of my invention.
FIG. 15 is a perspective view illustrating diagrammatically the manner in which the magnetic markings are impressed upon a metal container through use of marking apparatus of the character illustrated in FIGS. 10 through 14.

Reference has been made hereinbefore to the disadvantages attendant upon the batch type of operation for maintaining the segregation of different characters or qualities of foods packaged within the cans. These disadvantages become extremely serious in canneries which are equipped for the simultaneous processing of a plurality of characters or qualities of foods. The problem may perhaps be best understood by having reference to FIG. 9, which illustrates diagrammatically the methods employed for the simultaneous processing of a plurality of characters or qualities of such foods. As is represented in FIG. 9, empty cans are simultaneously fed as by means of conveyors represented by the lines bearing the reference characters 50A, 50B, and 50C to a first set of processing stations 51A, 51B, and 51C where the cans are simultaneously filled and capped. For example, when tomatoes are canned, they may be graded into three grades which might be known as grade A, grade B, and grade C. In such an installation, the cans supplied to the processing station 51A will be filled with grade A tomatoes, whereas grade B and grade C tomatoes will be used to fill the cans at stations 51B and 51C, respectively.

The filled cans are delivered by merging conveyors 52A, 52B, and 52C to a single second processing station 53 which may, and often does, comprise a suitable cooker for cooking the contents of the sealed can. After the cooking, sterilizing, or other process carried on at the second processing station 53, the cans are delivered by means of a conveyor 54 to the labeling or packing station where the cans are packed in suitable cartons for delivery to distributors and retail outlets. It will be appreciated, however, that the cans delivered by the conveyor 54 constitute a heterogeneous mixture of cans containing all three grades of tomatoes, requiring the cans to be individually identified and segregated before they can be appropriately labeled or packed in cartons.

According to my invention, this segregation of the different grades may be accomplished automatically by installing at each of the first processing stations 51A, 51B, and 51C suitable magnetic marking equipment such as has been hereinbefore described, and by connecting the conveyor 54 to a can sorting apparatus such as is represented by the material enclosed within the broken line 55 in FIG. 9.

The can sorting apparatus 55 includes a pickup device 56 which may be of appropriate type such as has been hereinbefore described. As the cans leave the pickup device 56, they are carried by a conveyor 57 to a first electro-mechanical gate 58. The gate 58 may be suitable electrical driving mechanism be placed in either of two conditions. In the first condition, a can delivered to the gate by the conveyor 57 will be transferred to a conveyor 59 which may be referred to as the grade A conveyor. In the alternate condition of the gate 58, the can is delivered to a continuing conveyor 60 which delivers cans carried thereby to a second electro-mechanical gate 61. The gate 61 may be so operated as to divert cans to a second branch conveyor 62 which may be referred to as the grade B conveyor, or to a continuing conveyor 63 which delivers cans carried thereby to a third electro-mechanical gate 64. The gate 64 may be so operated as to divert cans to a third branch conveyor 65 which may be referred to as the grade C conveyor, or to a reject conveyor 66 for taking out any cans which for any reason have not positively been identified.

The pickup unit 56 is electrically connected as indicated at 67 to suitable signal separating and relay apparatus 68 which in turn is electrically connected as indicated by the dotted lines 69A, 69B, and 69C to the electrical drive mechanism for the gates 58, 61, and 64, respectively. The apparatus included within the rectangle 68 includes suitable signal separating circuits for distinguishing among the three types of signals produced by the three different types of magnetic markings applied respectively to the cans containing grade A, grade B, and grade C tomatoes. The signals so separated operate time-delay relays which in turn control the operation of the corresponding electro-mechanical gates 58, 61, and 64. The timing of the time-delay relays is adjusted so as to cause operation of the appropriate gates at the time the can initiating such operation arrives at the gate location.

It will be understood that with the relatively simple time delay control described, the transit time of a can from the pickup 56 through the gate 64 must be less than the time between successive arrivals of cans at the pickup 56. This time relationship may be achieved by appropriate adjustment of the lengths and speeds of the conveyors 57, 60, and 63 and through the use of well-known spacing apparatus ahead of the pickup 56.

It is possible to simplify the apparatus by elimination of the gate 64, cans delivered to conveyor 63 being assumed to be grade C. Such an arrangement has the disadvantage, however, of delivering all cans as grade C regardless of their contents in the event of a failure of operation of the grade A or grade B markers or the pickup and detecting apparatus.

It will be seen that the apparatus 55 serves, then, to accept a heterogeneous mixture of cans containing a plurality of different characters or qualities of contents from the conveyor 54, and to cause an automatic separation and segregation of those cans so as to deliver to each of the three conveyors 59, 62, and 65 only cans containing a single class of product, each different class of product being delivered to different conveyors.

Figures 10, 13:
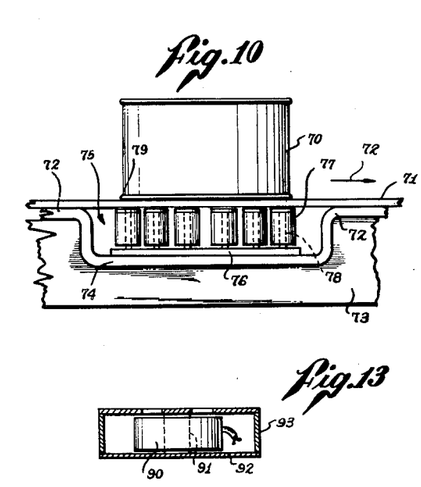
FIG. 10 is a fragmentary side elevational view illustrating a modified form of magnetic marking device particularly adapted for use with a system such as is represented by FIG. 9.
FIG. 13 is a fragmentary cross-sectional view of a modified form of marking apparatus which may be used in a system such as is represented by FIG. 9 in lieu of the marking means illustrated in FIGS. 10 and 11.

In FIGS. 10 through 16 I have illustrated certain types of magnetic marking and detecting apparatus which are perhaps better adapted for use with an automatic system such as is represented in FIG. 9 than are the marking and detecting devices previously described. FIG. 10 illustrates one form such different character of marking device may take.

In FIG. 10, a filled and capped can 70 is shown as resting upon a conveyor belt 71, which conveyor belt 71 is considered as being moved in the direction indicated by the arrow 72. During its movement in transporting the cans 70, the belt 71 may rest upon a suitable supporting plate 72 which is in turn carried by one or more frame members 73 forming a part of the structural framework of the conveyor line.

The marking station illustrated in FIG. 10 is positioned in the conveyor line 50 or 52, or in transfer conveyors associated with the first processing stations 51 so as to be unequivocally identified with the one character or quality of product handled by such conveyors.

Figure 11:
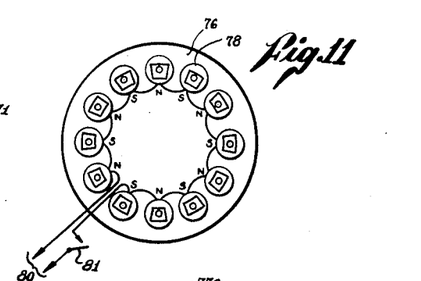
FIG. 11 is a plan view of the marking element shown in FIG. 10.

At the location of the marking station, the supporting plate or guide rail assembly 72 is depressed as indicated at 74 to provide a space beneath the conveyor belt 71, within which space is positioned a magnetic marking apparatus indicated generally by the reference character 75. The marking apparatus 75 comprises a base plate 76 formed of magnetic material on which is mounted a plurality of electromagnets 77. Each of the magnets 77 comprises a coil surrounding a magnetic core 78, one end of which is magnetically connected to the base plate 76, and the other upper end of which is terminated in a substantially rectangular pole shoe 78, as is shown in FIG. 11.

The plurality of electromagnets 77 are arranged in a circle and are angularly spaced uniformly from each other, and the circle on which the axes of each of the magnets 77 lie is of a diameter substantially equal to the mean diameter of the rim 79 of the can 70. The coils of the magnets 77 are all connected to a suitable source of unidirectional electric current, as is represented at 80, the coils being connected either in series or parallel, as desired. The coil connections are so arranged, however, that the magnetic polarity of the pole shoes 78 alternates around the circle, as is represented by the letters N and S appearing on FIG. 11 and indicating north and south polarity of the pole shoes 78.

The conveyor 71 is driven in an intermittent fashion with the cans 70 being indexed as to their position on the conveyor belt 71 so that each can is brought to rest momentarily in a position such as is represented in FIG. 10 in axial alignment with the magnetic marking apparatus 75. Alternatively, instead of intermittently driving the conveyor belt 71, the conveyor belt may be driven continuously and suitable well-known detent or holding mechanism used to engage the can 70 and hold it in the position shown in FIG. 10 for a brief period of time, during which the conveyor belt 71 merely slides along beneath the can 70.

While the can 70 is arrested in the position shown in FIG. 10, the electromagnets 77 are momentarily energized. To provide for such momentary energization of the magnets 77, a momentary contact switch 81 may be interposed in the electric circuit feeding the magnets 77. The switch, it will be understood, is arranged to be closed momentarily by the drive mechanism for the conveyor belt 71, or the detent mechanism for holding the can 70 so that the energization of the magnet 77 occurs during a time when the can is held stationary in the position shown.

Operation of the marking apparatus 75 as described causes the rim 79 of the can 70 to be permanently magnetized in accordance with the location and polarity of the individual electromagnets 77, as is illustrated, for example, by the diagrammatic showing in FIG. 15. In that figure, the blackened areas marked N or S are intended to represent areas of the can rim 79 which are permanently magnetized with a north or south polarity. The blackened areas are employed solely for the purpose of diagrammatic illustration, it being recognized that the magnetized areas do not differ in appearance in any way from the nonmagnetized areas.

I have found that magnetizing the rim 79 in the manner described provides a number of advantages over previously-described methods of magnetization hereinbefore described. In the first place, in the ordinary can construction the rim 79 constitutes a rolled and crimped joint between the sidewall member 82 of the can and the bottom member 83 thereof. The rim 79 has no less than five thicknesses of sheet metal, thus providing a relatively thick and heavy body as distinguished from the much thinner material constituting the sidewall 82. Furthermore, I have found that the rolling and crimping process produces a marked degree of work-hardening of the steel, with the result that the metal of the rim 79 has much better magnetic retentivity than does the unworked portions of the can. Also, by marking the rim 79 in the manner shown, the portion of the rim lying between adjacent magnetized areas operates in a manner analogous to the keepers which are conventionally kept across the poles of a horseshoe magnet, and thus operate to minimize demagnetization as a result of knocks, jars, temperature changes, and rough handling.

It will be observed that the marking apparatus illustrated in FIGS. 10 and 11 utilizes twelve of the electromagnets 77 so as to produce twelve of the magnetized areas on the can rim 79. Thus in traversing once the circumference of the rim 79, one passes six areas magnetized with a north polarity, and six interspersed areas magnetized with a south polarity. If a north and south pair are together considered as constituting a single "cycle," it will be seen that a single traverse of the circumference of the rim 79 will pass six of such magnetic cycles. Thus, the marking illustrated in FIG. 15 may be termed a six-cycle mark.

A distinguishably different marking may be obtained by employing a larger or smaller number of uniformly spaced electromagnets 77. For example, eight uniformly spaced magnets will produce a four-cycle marking, and sixteen uniformly spaced magnets will produce an eight-cycle marking. As will more clearly appear hereinafter, the pickup unit 56 cooperates with the signal separating apparatus 68 to distinguish among such various types of marking, by measuring the frequency of the alternating potential developed by a constant-speed relative rotation between the can 70 and an appropriate pickup coil. For example, if such relative rotation is at the rate of sixty revolutions per second, it will be seen that a four-cycle mark will produce an alternating potential having a frequency of two hundred and forty cycles per second, while six- and eight-cycle markings will produce frequencies of three hundred and sixty and four hundred and eighty cycles per second, respectively.

Figure 12:
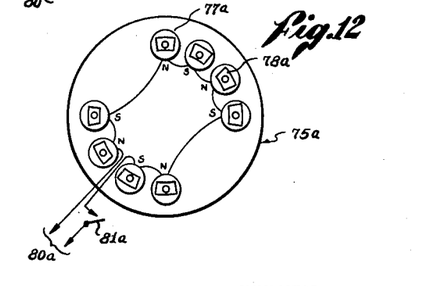
FIG. 12 is a plan view similar to FIG. 11, but illustrating a somewhat different arrangement of parts, used for magnetically marking cans according to a modified coding system.

While a coding system based upon frequency such as just described is preferred, my invention contemplates the employment of a coding system based on pulse-time relationships. For example, as is shown in FIG. 12, the marking device 75a may employ, for example, two groups of electromagnets 77a. In the form shown in FIG. 12, the two groups are diametrically opposed to each other, and each comprises four electromagnets 77a, and each group has an angular span of 90°. It will be understood that a can 70 marked with the marking device shown in FIG. 12 will have magnetized areas of alternate north and south polarity disposed in a configuration identical to the configuration of the coils 77a.

When a can marked by the device shown in FIG. 12 and a pickup coil are rotated relative to each other, there will be produced a characteristic pulse train consisting of two positive pulses alternated with two negative pulses, followed by a zero signal period having a time duration equal to the time duration of the four pulses. This type of signal is repeated so long as the relative rotation is continued. The number of pulses produced and the number of possible pulses which are not produced may be varied according to a predetermined code by changing the position, number, and arrangement of the electromagnets 77a, and suitable pulse analyzing apparatus may be made responsive to the varying characters of signals resulting from the described relative rotation.

Figure 14:
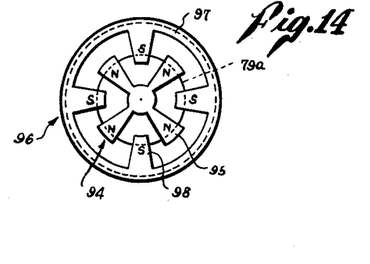
FIG. 14 is a plan view of the marking device shown in section in FIG. 13.

In FIGS. 13 and 14 I have illustrated a modified form of marking apparatus which may be substituted for the apparatus 75 of FIG. 10. The apparatus shown in FIGS. 13 and 14 comprises a single electromagnet 90 comprising a coil wound about a magnetic core 91. The lower end of the core 91 is magnetically connected to a base member 92 forming the bottom of a cup-like shell which encloses the coil 90 and which includes cylindrical sidewalls 93.

The upper end of the core 91 is magnetically connected to an inner pole shoe indicated generally by the reference character 94 in FIG. 14. The pole shoe 94 comprises a plurality of sector-like arms 95 spaced uniformly from each other and extending beyond the circle defined by the can rim 79, such circle being represented in FIG. 14 by the broken line bearing the reference character 79a. In FIG. 14 the pole shoe 94 is illustrated as having four of the arms 95.

To the upper edge of the cylindrical sidewall portion 93 I secure a complementary pole structure indicated generally in FIG. 14 by the reference character 96. This structure includes an annular portion 97 secured to the upper edge of the shell 93, and a plurality of inwardly extending pole shoes 98. The pole shoes 98 are equal in number to the pole shoes 95, and are so positioned as to lie midway between adjacent pole shoes 95. The pole shoes 98 have a length sufficient to extend beyond the can rim circle 79a.

When a unidirectional current is passed through the coil of the magnet 90, the upper end of the core 91 presents one magnetic polarity, while the lower end presents the opposite magnetic polarity. The pole shoes 95 have the same polarity as the upper end of the core 91; for example, as is represented in FIG. 14, each of the pole shoes 95 constitutes a north magnetic pole. In like manner, each of the pole shoes 98 constitutes a south magnetic pole. The portions of the pole shoes 95 and 98 lying on the can rim circle 79a thus serve to magnetize the can rim 79 in exactly the same manner as do the individual pole shoes 78 of the individual coils 77 shown in FIGS. 10 and 11.

A pulse-time type of marker similar to that shown in FIG. 12 may be constructed along the lines illustrated in FIGS. 13 and 14 by arranging the number and position of the pole shoes 95 and 98 in accordance with the desired pulse-time code and in relative positions corresponding to the positioning of the individual pole shoes 78a shown in FIG. 12.

Figure 16:
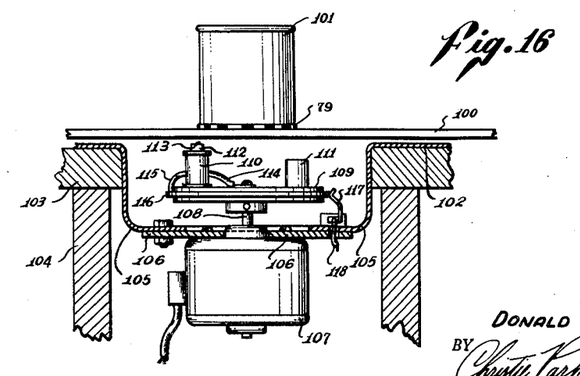
FIG. 16 is a fragmentary side elevational view of a pickup apparatus which may be used at the detecting station represented in FIG. 9.

Reference has been made hereinbefore to the generation of an electrical signal by producing a relative rotation between the can 70 and a suitable pickup coil. I have illustrated in FIG. 16 an apparatus suitable for producing such a relative rotation. In FIG. 16 I have illustrated a conveyor belt 100 as carrying a marked can 101. The conveyor belt 100 may rest upon a suitable supporting plate or guide rail 102 which is in turn carried by a conventional structural framework including horizontal members 103 and appropriate supporting legs 104. At the location of the pickup station 56 of FIG. 9, the conveyor guide rails 102 are bent downwardly as shown at 105 and secured to suitable brackets 106 attached to an electric motor 107 so as to support the electric motor in a position extending the rotating shaft 108 thereof vertically and in alignment with the center of the conveyor belt 100. Upon the upper end of the shaft 108 I secure a fly wheel 109, and upon the upper surface of the fly wheel 109 I mount an electromagnet 110 eccentrically located and spaced from the center of the fly wheel 109 by a distance substantially equal to the radius of the marked can rim 79. At a diametrically opposite location, I secure to the fly wheel 109 a counterbalance 111 for the purpose of dynamically balancing the fly wheel 109 and the parts carried thereby.

The electromagnet 110 comprises a coil wound about a suitable magnetic core which is extended upwardly as indicated at 112, terminating in a pole face 113 disposed below the conveyor belt 100 a distance sufficient to provide a small but adequate clearance between the pole face 113 and the conveyor belt 100. One terminal of the coil 110 may be grounded as indicated at 114, and the other terminal may be connected as shown at 115 to a suitable slip ring 116 secured to the periphery of the fly wheel 109 and electrically insulated therefrom. A suitable brush 117 is mounted on the stationary part of the apparatus in a position to engage the slip ring 116. An electrical conductor 118 connected to the brush 117 serves to deliver to the signal-separating apparatus 68 any electrical potentials generated in the coil of the magnet 110.

It will be understood that the conveyor belt 100 is driven intermittently so as to bring the marked can 101 to rest in a position axially aligned with the axis of rotation of the pickup coil 110. Such positioning of the marked can 101 may be effected by mechanism identical to that hereinbefore described with reference to FIG. 10 and the positioning of the can 70 shown thereon.

It will be seen that if the fly wheel 109 is rotated at a known constant speed during the time the can 101 is positioned as shown in FIG. 16, an alternating potential will be generated in the pickup coil 110. The frequency of this potential will be determined by the speed of rotation of the coil 110, and the number of complete marking cycles which are magnetically impressed upon the can rim 79, as has been hereinbefore described. Signals of differing frequency produced by differently marked cans are readily identified, selected, and routed to the appropriate relay apparatus through the use of filters, frequency-discriminating circuits, frequency bridges, or any of the other well-known types of frequency-sensitive circuits.

The arresting of the motion of the can 101 for a brief instant at the pickup station 56, while highly desirable, is not essential, as it is possible to obtain an adequate frequency determination during the passage of the can over the detecting apparatus by appropriate design of the frequency-discriminating equipment, particularly in the case where the conveyor belt 100 moves relatively slowly.

As has hereinbefore been mentioned, it occasionally happens that a marked can 101 will arrive at the detecting station wrong-side up—that is, with the magnetic markings uppermost instead of at the bottom. To protect against such a contingency, it is desirable to either duplicate marking equipment so as to mark both ends of the can, as has been hereinbefore mentioned, or alternatively, to provide duplicate detecting apparatus positioned immediately above and in alignment with that illustrated in FIG. 16 so as to be responsive to the uppermost magnetic markings in the event the can has been inverted.

Also, in order to minimize spurious and undesirable operations of the identifying and selecting apparatus, it is highly desirable to completely demagnetize the empty cans before they are fed to the filling station. Demagnetization of the cans may be accomplished by use of any of the well-known forms of apparatus heretofore utilized for such purposes. For example, the cans may be caused to pass through an intense alternating magnetic field. In so passing through the field, the intensity of the field gradually diminishes to zero as the cans move out of such limited field, with the result that the can is completely demagnetized.

Some large canning establishments simultaneously pack as many as eight or ten different kinds or qualities of food, utilizing eight or ten of the filling stations 51 shown in FIG. 9. Furthermore, in such installations it is the common practice to merge all cans of identical size, regardless of their contents, and feed them to a single capping machine. Thus the filled cans from eight or ten filling stations may be processed through two or three capping machines. Also, the eight or ten different kinds or qualities of foods so canned may require only two or three different cooking operations. That is to say, two or three of the products may require a first type of cooking process, another two or three may require a second type of cooking process, and the remainder of the products may all be treated by a third cooking process, the cooking processes differing from each other, for example, by differences in the time and temperature of the cooking. In such an installation, it becomes necessary to segregate into their separate and distinct classes each of the eight or ten different products canned, after they leave the capping machines, in order that they may be routed to the appropriate cookers, in addition to the segregation and classification required of the cans delivered from each of the cookers in order that they may be properly labeled or packaged. Such an intermediate segregation for the purpose of properly routing the cans to the different cookers is readily accomplished by means of the can sorting apparatus 55 shown in FIG. 9. If the can sorting apparatus 55 is employed, each of the eight or ten different classes of products is positively identified and routed by appropriate conveyor systems to the appropriate cooker. Alternatively, the cans may be marked at the filling stations with two separate sets of magnetic markings. The first set may be used to positively identify the contents of the can, and a second and dissimilar set may be used to identify which one of the available cookers is to receive the can so marked. In such a case, appropriate detecting apparatus such as has been described herein, responsive to the second set of markings, is interposed between the capping machines and the cookers.

From the foregoing it will be observed that I have provided a container identifying system which is particularly adapted for use in identifying the contents of that class of containers which has a portion made of a magnetizable material. Attention is directed to the fact that the system of my invention provides for magnetically marking containers in a distinguishable fashion so as to positively identify the character and quality or other property of the contents of the container, or of the container itself, and that the invention provides suitable detecting apparatus for detecting and interpreting such magnetic markings so as to provide a readily understandable and usable identification.

Attention is also directed to the simplicity and low cost of the magnetic marking and detection apparatus, which, despite such simplicity, is capable of use from the simplest application wherein it is desired to determine whether a can is rightside up or wrongside up to a relatively complex cannery installation for providing intermediate and final segregation of a large number of different classes of containers.

While the various forms the invention may take have been described primarily with reference to conventional tin cans and the processing thereof, it will be appreciated that the invention may be utilized with equal facility with substantially any type of container having a portion thereof of made of magnetizable material. In this connection it should be noted that containers normally containing no magnetic material, as for example containers made of cardboard, may readily be adapted for use with the system of my invention by securing to such containers a strip, band, ring, or disk of coated paper such as is currently used in magnetic tape sound recording devices. Alternatively, a coating of magnetic material may be applied directly to a non-magnetic container or a portion thereof in the same way that such coating materials are applied to magnetic tapes.

While I have shown and described a number of presently-preferred embodiments of my invention, I do not desire to be limited to any of the details illustrated or described, except as defined in the appended claims.

I claim:
1. The method of handling containers in a processing operation, during which goods are placed in the containers, consisting of the steps of inducing magnetic indications on the containers in accordance with a preselected A.C. frequency code, reading out the magnetic indications as electrical potentials, and directing the movement of the containers by means of said electrical potentials.

2. The method of handling containers in a processing operation, during which goods are placed in the containers, consisting of the steps of inducing adjacent magnetic indications on the containers, the spacing between adjacent magnetic indications being related to a preselected code, reading out the magnetic indications as an A.C. frequency, and directing the movement of the containers by means of the frequency readout.

3. The method of handling containers in a processing operation, during which goods are placed in the containers, consisting of the steps of inducing adjacent magnetic indications on the base of each container in accordance with a preselected A.C. frequency code in which the spacing between adjacent indications carries the coded information, reading out the magnetic indications as a series of electrical potentials, decoding the series of electrical potentials to give a command as to the subsequent movement of the container, and directing the movement of the container in accordance with the command.

4. The method of handling containers in a processing operation, in which goods are placed in the containers, consisting of the steps of inducing adjacent magnetic indications around the periphery of the base of each container in accordance with a preselected code, in which the spacing between adjacent indications of like polarity carries the coded information, initiating rotary relative motion between the container and a readout transducer so that the output of the transducer is an A.-C. potential whose frequency is related to the coded information, and directing the movement of the containers in accordance with the transducer output frequency.

5. The method of handling and sorting containers in a processing operation requiring segregation of cans into groups according to the contents of the processed goods contained within the containers, consisting of the steps of inducing a series of adjacent magnetic indications in circular disposition on a container in accordance with a preselected A.C. frequency code so that the magnetic indications are indicative of the group into which the container is to be segregated, subjecting the container to a processing operation, and segregating the container into the appropriate group by reading out the magnetic indications as a coded A.C. signal which initiates segregation by the processing equipment of the container into the appropriate group.

6. The method of handling tin cans in a goods-processing operation in which the cans are sorted in accordance with the characteristics of the goods they contain, consisting of the steps of inducing a series of adjacent magnetic indications on a peripheral rim of the can in accordance with a preselected code in which the spacing between like magnetic indications carries the intelligence being encoded, subsequently initiating rotary relative motion between the can and a magnetic transducer so as to read out the series of magnetic indications as an A.-C. potential, the frequency of which is indicative of the encoded information, and directing the motion of the can by means of said A.-C. potential frequency.

7. A cylindrical can formed of magnetizable material having at least one circumferential band-like area magnetized, the location and polarity of magnetization of said area representing, in accordance with a predetermined code, the contents of said can.

8. A cylindrical can formed of magnetizable material having a plurality of circumferential band-like areas magnetized, the locations and polarities of magnetization of said areas representing, in accordance with a predetermined code, the contents of said can.

9. An apparatus for magnetically marking closed containers formed of magnetizable material to identify and distinguish the tops of said containers from the bottoms thereof, comprising: a pair of spaced axially aligned solenoid coils, an electric circuit for supplying unidirectional current to said coils, conveyor means for supporting a container in an upright position with the height of said container substantially parallel to the axis of said coils while moving said container through the space between said coils, a switch in said circuit, and a switch actuator positioned to be engaged by a container disposed between said coils and operative in response to such engagement to close said switch.

10. An apparatus for magnetically marking, according to a predetermined code, containers having at least a circumferentially extending portion thereof formed of magnetizable material to identify the contents of said containers, comprising: a plurality of magnetic pole pieces arranged in a circle having a diameter substantially equal to the diameter of said portion, the number and angular spacing of said pole pieces conforming to said predetermined code; coil means for magnetizing said poles pieces; and circuit means for energizing said coil means.

11. The method of magnetically marking closed containers formed of magnetizable material to identify and distinguish the tops of said containers from the bottoms thereof, which consists in subjecting each of said containers to a relatively strong unidirectional magnetic field extending parallel to the height of said containers with each of said containers disposed in a predetermined attitude relative to said field, to thereby permanently magnetize each of said containers and produce at the top of each of said containers a magnetic pole of given known polarity.

12. The method of sorting according to their contents containers formed of magnetizable material which consists in magnetizing portions of the containers, the polarity of said magnetization being different for different contents, thereafter moving said containers successively past a given point, at said point detecting the polarity of said magnetized portions, and segregating said containers into classes each comprising solely containers having magnetized portions of the same polarity.

13. The method of sorting according to their contents containers formed of magnetizable material which consists in magnetizing a plurality of portions of said containers, said portions being spaced from each other along the length of said container, the number and location of said magnetized portions being different for different contents, thereafter moving said containers successively past a given point, at said point detecting the location of said magnetized portions, and segregating said containers into classes each comprising solely containers having the same number of said magnetized portions identically located.

14. The method of sorting according to their contents containers formed of magnetizable material which consists in magnetically recording upon each of said containers a signal of predetermined frequency, said predetermined frequency being different for different contents, thereafter moving said containers successively past a given point, at said point reproducing said magnetic recordings, and segregating said containers into classes each comprising solely containers carrying magnetic recordings of like frequency.

15. A can formed of magnetizable material having a top and a bottom, said can being magnetized longitudinally and exhibiting magnetic poles at the top and bottom thereof, said magnetic poles being of opposite polarity and respectively identifying said top and said bottom.

16. An apparatus for magnetically marking, according to a predetermined code, containers having at least a circumferentially extending portion thereof formed of magnetizable material, to thereby identify the contents of said containers, comprising: a plurality of electromagnets each comprising a coil and a core, each of said cores terminating in a pole face; means mounting said electromagnets in fixed spaced relation to each other with their axes parallel and said pole faces lying substantially in a single plane, said pole faces all lying substantially in a circle having a diameter substantially equal to the diameter of said circumferentially extending portions of said containers, the number of said electromagnets and the angular spacing of said pole faces about said circle conforming to said predetermined code; and circuit means for energizing said electromagnets interconnecting all of said electromagnets in alternating relationship with respect to polarity to magnetize adjacently disposed pole faces with opposite polarities of magnetization.

17. An apparatus for magnetically marking, according to a predetermined code, containers having at least a circumferentially extending portion thereof formed of magnetizable material, to thereby identify the contents of said containers, comprising: an electromagnet including a coil and a core of magnetic material extending longitudially through said coil; a first pole member of magnetic material secured to one end of said core and having a plurality of circumferentially spaced radially extending fingers defining a plurality of uniformly spaced pole faces of like polarity disposed about a circle, said fingers having a radial length such that the diameter of said circle is substantially equal to the diameter of said circumferentially extending portion of said containers; a second annular pole member surrounding said first pole member and having a plurality of radially and inwardly extending arms each terminating in a pole face, said inwardly extending arms being disposed between said fingers to dispose said last-mentioned pole faces on said circle, all of said pole faces being coplanar; magnetic circuit means connecting said second pole member to the other end of said core to magnetize the pole faces at the ends of said arms with a polarity opposite to said given polarity; and circuit means for energizing said coil.

18. An apparatus for decoding magnetic markings carried by containers having at least a circumferentially extending portion thereof formed of magnetizable material, a plurality of circumferentially and uniformly spaced areas of said portion being magnetized with adjacently disposed areas having opposite polarities of magnetization, and the number of said areas identifying the contents of said containers according to a predetermined code, said apparatus comprising: means for moving said containers successively to and away from a detecting station; pickup means at said detecting station including a pickup coil disposed in a position adjacent said circumferentially extending portion of a container at said station, and means for relatively rotating said coil and said container at said station substantially about the center of said circumferentially extending portion; and means connected to said pickup coil responsive to the frequency of electrical potential induced in said coil by said relative rotation for producing a distinguishable indication representative of the contents of said container according to said predetermined code.

19. An apparatus for decoding magnetic markings carried by containers having at least a portion thereof formed of magnetizable material, said portions being magnetized differently and identifying the contents of said containers according to a predetermined code, said apparatus comprising: means for moving said containers past a detecting station; pickup means at said detecting station including a pickup coil disposed in a position adjacent said portion of a container at said station; and a galvanometer connected to said pickup coil responsive to the magnitude and polarity of electrical potential induced in said coil by movement of said magnetized portion past said coil for producing a distinguishable indication representative of the contents of said container according to said predetermined code.

20. An apparatus for decoding magnetic markings carried by containers having at least a portion thereof formed of magnetizable material, said portions being magnetized differently and identifying the contents of said containers according to a predetermined code, said apparatus comprising: means for moving said containers successively to and away from a detecting station; and a magnetized compass needle at said detecting station disposed in a position adjacent said portion of a container at said station for indicating by its attraction thereto or repulsion therefrom the polarity of the magnetization of said portion to thereby produce a distinguishable indication representative of the contents of said container according to said predetermined code.

21. An apparatus for determining and identifying the attitude of a container formed of magnetizable material having a top and a bottom and being longitudinally magnetized and providing at said top a magnetic pole of given polarity, said apparatus comprising: means for moving said container past a detecting station; a pair of pole pieces disposed on opposite sides of the path of movement of said container, one of said pole pieces being disposed closely adjacent the path of movement of one end of said container and the other of said pole pieces being disposed closely adjacent the path of movement of the other end of said container; a magnetic core spaced from said path of movement and interconnecting said pole pieces; a coil wound about said core; and means connected to said coil responsive to the magnitude and polarity of electrical potential induced in said coil by movement of said magnetized container between said pole pieces for producing a distinguishable indication representative of the attitude of said container.

22. An apparatus for sorting according to their contents containers having at least a circumferentially extending portion thereof formed of magnetizable material, comprising: means for magnetizing a plurality of circumferentially and uniformly spaced areas of said portion with adjacently disposed areas of opposite polarities of magnetization to identify the contents of each container according to a predetermined code; means for moving said containers successively to and through a detecting station and from said detecting station to a diverting station; pickup means at said detecting station including a pickup coil disposed in a position adjacent said circumferentially extending portion of a container at said station, and means for relatively rotating said coil and said container at said station substantially about the center of said circumferentially extending portion; frequency responsive means connected to said pickup coil for decoding the identification represented by the magnetized areas of said portions; a plurality of diverting means at said diverting station, each of said diverting means being actuatable to move a container to a physically distinct location; and translating means connected between said frequency responsive means and each of said diverting means for selectively actuating said diverting means in accordance with the frequency of said electrical potential to thereby sort said containers in accordance with the identification afforded by said decoding.

23. An apparatus for sorting according to their contents containers having at least a circumferentially extending portion thereof formed of magnetizable material, comprising: means for magnetizing a plurality of circumferentially and uniformly spaced areas of said portion with adjacently disposed areas of opposite polarities of magnetization to identify the contents of each container according to a predetermined code; means for moving said containers successively to and through a detecting station and from said detecting station to a diverting station; pickup means at said detecting station including a pickup coil disposed in a position adjacent said circumferentially extending portion of a container at said station, and means for relatively rotating said coil and said container at said station substantially about the center of said circumferentially extending portion; a plurality of diverting means at said diverting station, each of said diverting means being actuatable to move a container to a physically distinct location; signal separating means connected to said pickup coil responsive to the frequency of the electrical potential induced in said coil by said relative rotation for providing a plurality of separate output signals of different frequencies, each of said signals being representative of different specific container contents identified according to said predetermined code; and actuating means for each of said diverting means, each of said actuating means being connected to said signal separating means and responsive to one of said plurality of output signals for actuating said diverting means.

24. The method of magnetically marking, according to a predetermined code, a cylindrical can formed of magnetizable material, to thereby identify the contents thereof, which consists in permanently magnetizing at least one circumferential band-like area of said can, the location and polarity of magnetization of said area conforming to said predetermined code.

25. The method of magnetically marking, according to a predetermined code, a cylindrical can formed of magnetizable material, to thereby identify the contents of said can, which consists in permanently magnetizing a plurality of circumferential band-like areas of said material, the locations and polarities of magnetization of said areas so magnetized conforming to said predetermined code.

References Cited in the file of this patent

UNITED STATES PATENTS

| | | |
|---|---|---|
| 1,971,189 | Leibing | Aug. 21, 1934 |
| 1,983,342 | Chambers | Dec. 4, 1934 |
| 2,258,106 | Bryce | Oct. 7, 1941 |
| 2,259,904 | McNamee et al. | Oct. 21, 1941 |
| 2,306,211 | Geiss | Dec. 22, 1942 |
| 2,505,398 | Harris | Apr. 25, 1950 |
| 2,540,654 | Cohen | Feb. 6, 1951 |
| 2,628,572 | Le Goff | Feb. 17, 1953 |
| 2,657,794 | Johnson et al. | Nov. 3, 1953 |
| 2,721,990 | McNaney | Oct. 25, 1955 |